United States Patent
Haslestad et al.

(10) Patent No.: US 9,686,415 B2
(45) Date of Patent: Jun. 20, 2017

(54) SYSTEMS AND METHODS OF SPLIT BILLING

(71) Applicant: AT&T INTELLECTUAL PROPERTY I, L.P., Atlanta, GA (US)

(72) Inventors: Maryann Haslestad, Somerset, NJ (US); George Alto, Oakhurst, NJ (US); Kiran Banoor, N. Brunswick, NJ (US); Gus Bourg, Renton, WA (US); Diane Didio, Toms River, NJ (US); Jonathan Genz, Beacon Falls, CT (US); Gregory Herrera, Sea Girt, NJ (US); Brian Keller, Milton, GA (US); Daniel P. Malee, Wheaton, IL (US); Richard J. Mnich, Holmdel, NJ (US); Marcel Theodore Rivard, Woodinville, WA (US); Mildred Roman, Somerset, NJ (US); Shilpa Subramaniam, Sammamish, WA (US); Laury Ann Wills, Little Silver, NJ (US); Scott Young, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/934,848

(22) Filed: Nov. 6, 2015

(65) Prior Publication Data
US 2017/0134589 A1 May 11, 2017

(51) Int. Cl.
| H04M 11/00 | (2006.01) |
| H04M 15/10 | (2006.01) |
| H04M 15/00 | (2006.01) |
| H04L 12/46 | (2006.01) |

(52) U.S. Cl.
CPC ........ *H04M 15/10* (2013.01); *H04L 12/4641* (2013.01); *H04M 15/07* (2013.01); *H04M 15/56* (2013.01); *H04M 15/67* (2013.01)

(58) Field of Classification Search
CPC ...... H04M 15/10; H04M 15/07; H04M 15/56; H04M 15/57; H04L 12/4641
USPC ........................................................ 455/406
See application file for complete search history.

(56) References Cited

U.S. PATENT DOCUMENTS

| 5,197,094 A | * | 3/1993 | Tillery | G07F 5/18 379/102.03 |
| 5,544,161 A | | 8/1996 | Bigham et al. | |
| 5,659,601 A | * | 8/1997 | Cheslog | H04M 15/00 379/119 |
| 5,682,325 A | | 10/1997 | Lightfoot et al. | |

(Continued)

OTHER PUBLICATIONS

Beirne, M., "Using an ATM to Hit a Bull's Eye"; Financial Services Online, Jan./Feb. 1998, 4 pages.

(Continued)

*Primary Examiner* — Marceau Milord
(74) *Attorney, Agent, or Firm* — Toler Law Group, PC

(57) ABSTRACT

A method includes generating a request at an electronic device associated with a plurality of data usage accounts. The method also includes selectively encapsulating, by the electronic device, the request to generate an encapsulated request that identifies a destination endpoint provisioned for a first data usage account of the plurality of data usage accounts. The method further includes transmitting the encapsulated request from the electronic device to a network element.

18 Claims, 6 Drawing Sheets

(56) References Cited

U.S. PATENT DOCUMENTS

| | | | |
|---|---|---|---|
| 6,055,504 A | 4/2000 | Chou et al. | |
| 7,149,293 B1 | 12/2006 | Coppage et al. | |
| 7,280,847 B2 | 10/2007 | Goldthwaite et al. | |
| 7,289,489 B1 | 10/2007 | Kung et al. | |
| 7,315,891 B2 | 1/2008 | Donahue | |
| 7,697,672 B2 | 4/2010 | Cesarini | |
| 7,760,711 B1 | 7/2010 | Kung et al. | |
| 7,877,086 B2 | 1/2011 | Jagadeesan et al. | |
| 8,112,062 B2 | 2/2012 | Pattabiraman | |
| 8,321,952 B2 | 11/2012 | Spalink et al. | |
| 8,386,351 B2 | 2/2013 | Karlsson | |
| 8,503,978 B2 | 8/2013 | Gaddam et al. | |
| 8,675,476 B2 | 3/2014 | Brownworth et al. | |
| 8,750,250 B2 | 6/2014 | Milam et al. | |
| 8,756,321 B2 | 6/2014 | Clark et al. | |
| 8,838,487 B1 | 9/2014 | Rieschick et al. | |
| 8,838,488 B1 | 9/2014 | Breau et al. | |
| 8,868,639 B2 | 10/2014 | Raleigh et al. | |
| 8,938,547 B1 | 1/2015 | Roberge et al. | |
| 9,100,390 B1 | 8/2015 | Asnis et al. | |
| 9,106,538 B1 | 8/2015 | Asnis | |
| 9,232,012 B1 * | 1/2016 | Roberge | H04L 67/2814 |
| 9,232,013 B1 * | 1/2016 | Asnis | H04L 63/0272 |
| 9,350,818 B2 * | 5/2016 | Asnis | H04L 43/0876 |
| 2003/0115316 A1 | 6/2003 | Yang-Huffman | |
| 2004/0098306 A1 * | 5/2004 | Fitzpatrick | G06Q 30/02 705/14.13 |
| 2005/0255827 A1 | 11/2005 | Foster et al. | |
| 2006/0026669 A1 | 2/2006 | Zakas | |
| 2006/0026681 A1 | 2/2006 | Zakas | |
| 2006/0104214 A1 | 5/2006 | Borella | |
| 2006/0155854 A1 | 7/2006 | Selgert | |
| 2007/0201642 A1 | 8/2007 | Cesarini | |
| 2007/0206515 A1 | 9/2007 | Andreasen et al. | |
| 2007/0232322 A1 | 10/2007 | Jagadeesan et al. | |
| 2008/0080374 A1 | 4/2008 | Nuzman et al. | |
| 2008/0085707 A1 | 4/2008 | Fadell | |
| 2008/0114690 A1 | 5/2008 | Skidmore et al. | |
| 2008/0154625 A1 * | 6/2008 | Serbanescu | G06Q 30/0601 705/26.1 |
| 2009/0061816 A1 | 3/2009 | Ergezinger et al. | |
| 2009/0149154 A1 | 6/2009 | Bhasin | |
| 2009/0182873 A1 | 7/2009 | Spalink et al. | |
| 2009/0325582 A1 | 12/2009 | Jagadeesan et al. | |
| 2011/0040663 A1 | 2/2011 | Cai et al. | |
| 2011/0255688 A1 | 10/2011 | Spalink et al. | |
| 2012/0020218 A1 | 1/2012 | Li et al. | |
| 2012/0041851 A1 | 2/2012 | Tan | |
| 2012/0069748 A1 | 3/2012 | Van Den Bogaert | |
| 2012/0289147 A1 | 11/2012 | Raleigh et al. | |
| 2013/0132854 A1 * | 5/2013 | Raleigh | G06F 3/0482 715/738 |
| 2013/0157663 A1 | 6/2013 | Brownworth et al. | |
| 2013/0231080 A1 | 9/2013 | Cheuk et al. | |
| 2013/0238777 A1 | 9/2013 | Raleigh et al. | |
| 2013/0258949 A1 | 10/2013 | Bari et al. | |
| 2013/0286875 A1 | 10/2013 | Morrill | |
| 2013/0316703 A1 * | 11/2013 | Girard | G06Q 20/145 455/432.1 |
| 2014/0095690 A1 | 4/2014 | Saker et al. | |
| 2014/0098671 A1 * | 4/2014 | Raleigh | H04M 15/80 370/235 |
| 2014/0112299 A1 | 4/2014 | Frank et al. | |
| 2014/0179266 A1 | 6/2014 | Schultz et al. | |
| 2014/0273933 A1 | 9/2014 | Sharma et al. | |
| 2014/0289383 A1 | 9/2014 | Draznin et al. | |
| 2015/0109967 A1 * | 4/2015 | Hogan | H04W 76/022 370/259 |

OTHER PUBLICATIONS

Christianson, R., "Billing large: What do C&I customers want?"; Public Utilities Fortnightly, Suppl. Information Technology; The Competitive Edge (Fall 1999), pp. 36-44.

Lim, A., "Can I put two SIM cards in one mobile phone?"; Jun. 29, 2006, Retrived from http://www.cnet.com/news/can-i-put-two-sim-cards-in-one-mobile-phone/, 2 pages.

U.S. Appl. No. 14/573,601, filed Dec. 17, 2014.
U.S. Appl. No. 14/608,662, filed Jan. 29, 2015.
U.S. Appl. No. 14/615,799, filed Feb. 6, 2015.
U.S. Appl. No. 14/802,701, filed Jul. 17, 2015.
U.S. Appl. No. 14/816,385, filed Aug. 3, 2015.
U.S. Appl. No. 14/822,150, filed Aug. 10, 2015.

* cited by examiner

SYSTEMS AND METHODS OF SPLIT BILLING

FIELD OF THE DISCLOSURE

The present disclosure is related to split billing for electronic devices.

BACKGROUND

Employers often allow employees to access enterprise (e.g., work-related) data on personal devices. For example, employers may offer a bring-your-own-device (BYOD) program that lets employees use their personal mobile phones or tablet computers to access work e-mail, contacts, calendars, documents, etc. When a device is used for both business and personal use, it may be difficult to separately track the business use and the personal use.

DETAILED DESCRIPTION

Figure 1:
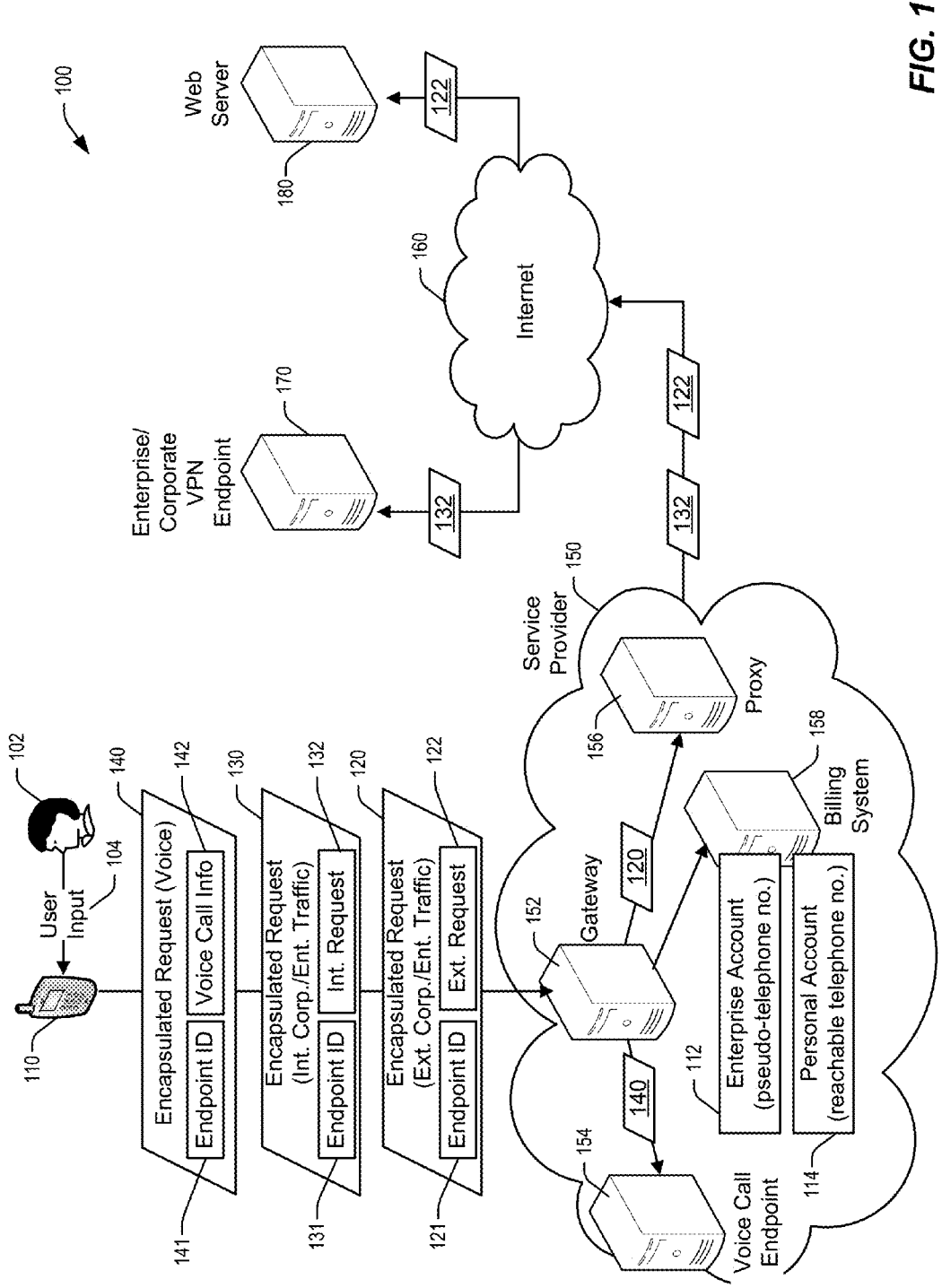
FIG. 1 is a diagram of a particular illustrative embodiment of a system that supports split billing for data usage by an electronic device.

Systems and methods of "split billing" are disclosed. The disclosed systems and methods enable separate and accurate tracking of enterprise vs. personal data usage by a device, so that the usage can be billed separately (e.g., to different entities). The described techniques may be used to track various types of data, such as hypertext transfer protocol (HTTP) data, HTTP secure (HTTPS) data, and multimedia (e.g., video/voice traffic) data, as illustrative non-limiting examples.

In one example, a "container" may be installed to a user's electronic (e.g., mobile) device. The container may correspond to an application or a set of applications, and the container may be activated/deactivated by the user to switch between a work mode (in which data usage will be charged to an enterprise account) and a personal mode (in which data usage will be charged to a personal account). Enterprise data may be accessed from within the container (e.g., when the container is activated). Data usage within the container may be counted as business usage that is billed according to the enterprise account. Conversely, data usage outside the container may be counted as personal usage that is billed according to the user's personal account.

When the user operates the electronic device in work mode, data requests may be encapsulated in a tunnel endpoint request that identifies a destination endpoint. For example, different destination endpoints may be set up and used for voice calls, virtual private networking (VPN) or other business endpoints, internet access, etc. As an example, a Socket Secure (SOCKS) proxy endpoint may be used for internet access. In this example, a request for "website.com" may be used to generate the encapsulated request "SOCKSproxy.examplenetwork.com/request=website.com". The device may send the encapsulated request to a network element corresponding to the destination endpoint (e.g., a server corresponding to SOCKSproxy.examplenetwork.com), where the original request for "website.com" is extracted and forwarded to an internet server associated with "website.com". The network element may also determine, based on the SOCKS endpoint identified in the encapsulated request, that data usage associated with the request to "website.com" is to be identified to the enterprise account. The network element may send an identifier to a billing system to indicate that the data usage is business vs. personal data usage.

In some implementations, each data usage account associated with the user's device corresponds to a telephone number, and the telephone number corresponding to the active account is included in the encapsulated request. It should be noted, however, that all telephone numbers may not be reachable. For example, the personal account may correspond to a reachable/dialable telephone number, whereas the enterprise account may correspond to a pseudo-telephone number that is not reachable/dialable (e.g., no telephone device would ring if someone dials the pseudo-telephone number). The pseudo-telephone number may enable the billing system to generate bills for the enterprise account. For example, because the billing system may be configured to rate, tax, and render bills for individual telephone numbers, assigning a pseudo-telephone number to the enterprise account may enable the billing system to generate bills for the enterprise account. However, the pseudo-telephone number may not be included in a request to the network from the electronic device. Rather, the network may detect the personal/dialable telephone number of the device in the request and an information technology (IT) system may cross reference to the pseudo-telephone number from the personal/dialable telephone number.

In a particular embodiment, a method includes generating a request at an electronic device associated with a plurality of data usage accounts. The method also includes selectively encapsulating, by the electronic device, the request to generate an encapsulated request that identifies a destination endpoint provisioned for a first data usage account of the plurality of data usage accounts. The method further includes transmitting the encapsulated request from the electronic device to a network element.

In another particular embodiment, a network element includes a processor and a memory storing instructions executable by the processor to perform operations including receiving an encapsulated request from an electronic device, where the encapsulated request identifies a destination endpoint that is provisioned for a first data usage account of a plurality of data usage accounts associated with the electronic device. The operations also include determining, based on the destination endpoint, that data usage associated with the encapsulated request is to be charged to the first data usage account.

In another particular embodiment, a computer-readable storage device stores instructions that, when executed by a processor, cause the processor to perform operations including generating a request at an electronic device associated with an enterprise account and a personal account. The operations also include selectively encapsulating the request to generate an encapsulated request that identifies a destination endpoint provisioned for the enterprise account. The operations further include transmitting the encapsulated request from the electronic device to a network element.

Referring to FIG. 1 a diagram illustrates an embodiment of a system 100 that is operable to support split billing. It should be noted that various components of the system 100 described herein may be implemented by hardware, by software (e.g., instructions executable by a processor), or by a combination thereof.

The system 100 includes an electronic device 110 associated with a user 102. In the example of FIG. 1, the electronic device 110 is a mobile phone. In alternative embodiments, the electronic device 110 may be a tablet computer, a laptop computer, a desktop computer, a portable media player, a television, a set-top box, a game console, or another type of electronic device.

The electronic device 110 may include various components, such as a processor, a memory, wireless interfaces, etc. In an illustrative example, the electronic device 110 includes at least one wireless interface that can be used to send data to and receive data from one or more network elements that correspond to (e.g., are owned and/or operated by) a service provider 150. For example, for an electronic device 110 that is a mobile phone, the service provider 150 may support communication using wireless technologies such as third generation (3G), fourth generation (4G), long term evolution (LTE), LTE advanced (LTE-A), universal mobile telecommunication system (UMTS), general packet radio service (GPRS), high speed packet access (HSPA), evolved HSPA (HSPA+), etc. The electronic device 110 may also include additional interfaces, such as an Institute of Electrical and Electronics Engineers (IEEE) 802.11 interface, etc. that do not rely on the service provider 150 for communication.

In accordance with the present disclosure, the electronic device 110 may be associated with a plurality of data usage accounts, which may correspond to respective billing profiles that enable separate billing of data/service usage. For example, as shown in FIG. 1, the electronic device 110 may be associated with an enterprise account 112 and a personal account 114. It is to be noted that data regarding the accounts 112, 114 may not be stored at the electronic device 110. In an illustrative example, as shown in FIG. 1, relationships between personal and enterprise telephone numbers may be stored and used by IT systems, such as the billing system 158.

During operation at the electronic device 110, data and/or service usage may be charged to one of the accounts 112, 114, as further described herein. In a particular embodiment, the user 102 may provide user input 104 to indicate whether data usage is personal or corporate/enterprise. For example, the user input 104 may be received during execution of an application at the electronic device 110, where the application enables the user 102 to switch between indicating that the data usage is to be identified to the personal account 114 or to the enterprise account 112, as further described with reference to FIG. 2. The enterprise account 112 may be an account specific to the electronic device 110 or to the user 102. Alternatively, enterprise account 112 may be applicable for multiple electronic devices operated by multiple employees of an enterprise.

In a particular embodiment, each account 112, 114 is associated with a telephone number. Thus, in accordance with the present disclosure, the single electronic device 110 may be associated with multiple telephone numbers. In the illustrated example, the personal account 114 is associated with a "reachable" or "dialable" telephone number that can be dialed (or input by a user into a communication device) to initiate a telephone call with the electronic device 110. In contrast, the enterprise account 112 may be associated with a pseudo-telephone number that is not reachable/dialable (e.g., no telephone device would ring if someone dials the pseudo-telephone number). The pseudo-telephone number may enable a billing system to generate bills for the enterprise account 112. The accounts 112, 114 may be associated with different billing information (e.g., mailing addresses for bills, payment methods, etc.). It should be noted that the accounts 112, 114 illustrated in FIG. 1 are for example only and are not to be considered limiting. In alternative embodiments, the system 100 of FIG. 1 may support split billing according to different numbers and types of accounts (e.g., different accounts for different users that share a common phone or other electronic device, etc.).

The service provider 150 may own and/or operate various network elements that enable split billing at the system 100. For example, as shown in FIG. 1, a gateway 152, a voice call endpoint 154, a proxy 156, and a billing system 158 may be associated with the service provider 150. As shown in FIG. 1 and as further described herein, the network elements of the service provider 150 may enable the electronic device 110 to access a corporate/enterprise virtual private networking (VPN) endpoint 170 and/or a web server 180 that is accessible via the internet 160.

As a first example of operation at the system 100, the user 102 may provide user input 104 indicating that data usage is to be charged to a corporate/enterprise account (e.g., the user input 104 may be considered as "selecting" the enterprise account 112). The electronic device 110 may generate a request that is to be serviced by the service provider 150. For example, the request may be generated in response to the user 102 initiating a voice over internet protocol (VoIP) call. As another example, the request may be generated in response to the user 102 attempting to access a virtual private networking (VPN) sever maintained by his or her employer. As yet another example, the request may be generated in response to the user 102 attempting to access an internet location (e.g., web page, streaming video, streaming music, etc.).

The electronic device 110 may encapsulate the request to generate an encapsulated request. Depending on the nature of the request (e.g., VoIP, VPN, web, etc.), the encapsulated request may identify a particular destination endpoint offered by the service provider 150 to track data usage for split billing.

For example, a first encapsulated request 120 may include information 121 (e.g., a uniform resource locator (URL)) identifying the proxy 156. The first encapsulated request 120 may correspond to "external" corporate/enterprise traffic (e.g., data traffic associated with entities outside of a corporate/enterprise network). The first encapsulated request 120 may include information associated with an external traffic request 122. For example, if the user 102 clicks on a hyperlink in a browser application at the electronic device 110, the information associated with the request 122 may include an internet URL corresponding to a destination of the hyperlink. In a particular embodiment, the proxy 156 is hosted at a multi-service platform (MSP) of the service provider 150, as further described herein. In an alternative embodiment, the proxy 156 is hosted at the gateway 152 or at another device. In some examples, the proxy is a socket secure (SOCKS) proxy, such as a SOCKS5 proxy.

To illustrate, the request 122 may be a hypertext transfer protocol (HTTP) request specifying the URL "www.example.com." If the URL of the proxy 156 is "SOCKSproxy.examplenetwork.com," then the first encapsulated request 120 may be "SOCKSproxy.examplenetwork.com/request=www.example.com." As shown in FIG. 1, the gateway 152 may receive the first encapsulated request 120 and determine that data usage associated with the first encapsulated request 120 (e.g., data usage associated with accessing the URL www.example.com) is to be identified to the enterprise account 112. The gateway 152 may tag the data as split billing data, and the billing system 158 may receive information (e.g., a message) indicating that tagged data is to be identified to the enterprise account 112, rather than the personal account 114. In the described example, data usage associated with the first encapsulated request 120 may include data (e.g., webpages, multimedia, etc.) that is provided to the electronic device 110 as a result of visiting the www.example.com website. The gateway 152 may forward the first encapsulated request 120 to the proxy 156, and the proxy 156 may extract the request 122 and forward the extracted request 122 to the web server 180 (e.g., a server for the www.example.com website) via the internet 160. As additional messages are communicated between the electronic device 110 and the web server 180, components within the service provider network may continue to tag/count data usage for billing purposes, such as by generating/updating call detail records (CDRs) with a split billing ID, as further described with reference to FIG. 2. In some systems, call detail records may alternatively be referred to as call data records.

As another example, a second encapsulated request 130 may be associated with internal corporate/enterprise traffic that is associated with entities within the corporate/enterprise network, such as VPN endpoints, file servers, other business endpoints, etc. In a particular example, the second encapsulated request 130 may include information 131 (e.g., a URL) identifying a corporate/enterprise endpoint, such as the VPN endpoint 170. The second encapsulated request 130 may also include information associated with an internal traffic (e.g., VPN or business) request 132, such as an IP address, a username, a password, etc. that can be used to set up a connection between the electronic device 110 and an internal corporate/enterprise endpoint. To illustrate, the second encapsulated request 130 may be generated in response to the user 102 executing a VPN application at the electronic device 110 to send and receive work e-mail, access a shared file server maintained by an employer, etc. The gateway 152 may receive the second encapsulated request 130 and may tag data usage associated with the second encapsulated request 130 (e.g., data usage during set up, use, and tear down of the VPN connection between the electronic device 110 and the VPN endpoint 170) as business data (e.g., identified to the enterprise account 112). As an illustrative non-limiting example, the gateway 152 may store or have access to a list (e.g., a "manifest") of enterprise/corporate VPN URLs, IP addresses, hostnames, etc. associated with a particular enterprise or corporation. The gateway 152 may determine that VPN data usage is to be identified to the enterprise or corporation based on the VPN endpoint 170 being included in the list. Thus, in particular embodiments, the service provider 150 may generate, maintain, and/or have access to lists of internal corporate/enterprise endpoints for different corporations or enterprises. Use of a manifest system is further described with reference to FIG. 2. The gateway 152 (or another network element) may tag the data as split billing data, so that the data will be charged to the enterprise account 112. The gateway 152 may also extract and forward the request 132 to the VPN endpoint 170 via the internet 160, as shown. Data usage associated with the second encapsulated request 130 may include data that is provided to the electronic device 110 as a result of initiating and maintaining the VPN connection between the electronic device 110 and the VPN endpoint 170. As additional messages are communicated between the electronic device 110 and the VPN endpoint 170, components within the service provider network may continue to tag/count data usage for billing purposes, such as by generating/updating CDRs with a split billing ID, as further described with reference to FIG. 2.

As another example, a third encapsulated request 140 may include information 141 identifying a voice call endpoint 154 of the service provider 150. The third encapsulated request 140 may also include voice call information 142 (e.g., a destination telephone number that the user 102 is attempting to reach). To illustrate, the user 102 may use an over-the-top (OTT) voice calling application to make a work-related call. The voice calling application may encapsulate request(s) so that the work-related call does not count against a time allotment (e.g., monthly minutes allotment) on the user's personal cellular phone account. The third encapsulated request 140 may be generated when the user 102 presses a "dial" key (e.g., a physical button or a touchscreen button) after the entering the destination telephone number into the voice calling application, selecting the destination telephone number in an address book of the voice calling application, etc. The electronic device 110 may transmit the third encapsulated request 140 to the gateway 152. The gateway 152 may process the third encapsulated request 140 and determine, based on data included in the third encapsulated request 140, that data usage for the voice call is to be identified to the enterprise account 112. In particular examples, data usage associated with voice calls may be measured in terms of minutes or amounts of data (e.g., bytes), such as in the case of VoIP calls. The gateway 152 (or another network element) may tag the data as split billing data, so that the data is charged to the enterprise account 112. The gateway 152 may forward the third encapsulated request 140 (or at least the voice call information 142) to the voice call endpoint 154, as shown. The voice call endpoint 154 may perform one or more operations to service the third encapsulated request 140, such as initiate and conduct a voice call, a VoIP call, etc.

Although not shown in FIG. 1, it is to be understood that the encapsulated requests 120, 130, 140 may also include information associated with the electronic device 110 (or the active data usage account), such as a telephone number (alternatively referred to as a mobile station international subscriber directory number (MSISDN)). While the aforementioned examples are directed to corporate/enterprise data usage that is to be charged to the enterprise account 112, it is to be understood that the system 100 also supports tracking personal data usage for the personal account 114.

To illustrate, if the user 102 provides user input 104 to indicate personal usage, the electronic device 110 may not encapsulate requests. Thus, in this example, the service provider 150 may determine whether data usage is to be charged to the enterprise account 112 or the personal account 114 based on whether the request is encapsulated. Alternatively, requests corresponding to personal data usage may be encapsulated differently. For example, encapsulated requests for personal data usage may identify different endpoints (e.g., a different proxy, a different VPN URL, etc.) than the encapsulated requests 120, 130, 140 for corporate/enterprise data usage. Thus, in this example, the service provider 150 may determine whether data usage is personal or corporate/enterprise based on the endpoint identified in the encapsulated request. For example, if an encapsulated request identifies an endpoint that has been provisioned as a split billing endpoint for the electronic device 110, data usage may be billed according to the enterprise account 112. If a request is not encapsulated or is encapsulated while specifying an endpoint that has not been provisioned as a split billing endpoint for the electronic device 110, the data usage may, by default, be billed according to the personal account 114. Additional examples of tracking data usage for split billing are further described with reference to FIG. 2.

It should be noted that the specific types of requests (e.g., voice, VoIP, VPN, HTTP, web, etc.) described herein are for example only and are not to be considered limiting. In alternative embodiments, the electronic device 110 may generate more, fewer, and/or different types of requests and/or encapsulated requests. Moreover, in selected embodiments, certain electronic devices may be provisioned such that all data usage is billed to a particular account (e.g., all data usage may be considered to be personal data usage or all data usage may be considered to be business data usage).

Figure 2:
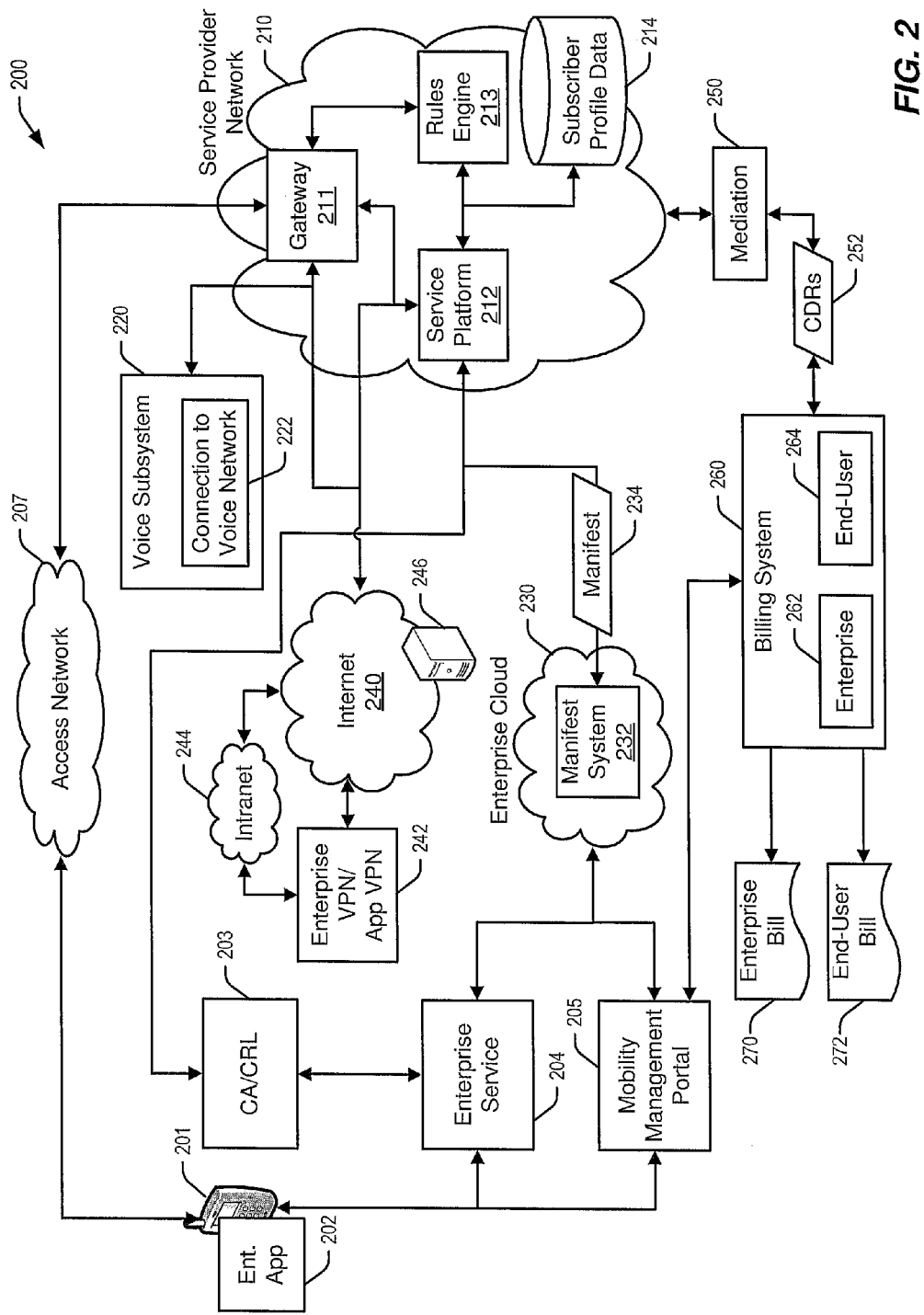
FIG. 2 is a diagram of another particular illustrative embodiment of a system that supports split billing for data usage by an electronic device.

FIG. 2 illustrates another embodiment of a system 200 that supports split billing for data usage by an electronic device 201. The electronic device 201 may execute an enterprise application 202 that enables a user to switch between personal and business data usage, as described with reference to FIG. 1. In a particular embodiment, the enterprise application 202 is a "container" or "workspace," and access to corporate data, files, e-mail accounts, etc. is available by executing other applications within the container/workspace. For example, other applications, such as a web browser, an e-mail application, a document editing application, a media player application, etc. may be executed from within the split billing container or workspace, and data requests made by such applications are billed as enterprise data instead of personal data. The enterprise application 202 may be downloaded or sideloaded to the electronic device 201 and installed by the user, a corporate IT administrator, etc.

FIG. 2 includes a certificate authority (CA)/certificate revocation list (CRL) 203, an enterprise service 204 (e.g., a split billing management service), and a mobility management portal 205. The CA/CRL 203 may be used to issue and/or verify certificates that enable the electronic device 201 to access a service provider network 210. The enterprise service 204 and the mobility management portal 205 may be used to provision split billing for enterprise customers and individual employees, as further described herein. One or more of the network elements 203, 204, 205 may be a part of a network that is operated by the service provider and/or by an individual enterprise (e.g., an employer).

In a particular embodiment, the enterprise service 204 supports application programming interface (API)-based retrieval of device activity information (e.g., from the MMP 205) and VPN IP addresses and hostnames from the manifest system 232. The enterprise service 204 (or the enterprise application 202) may also be configured to identify a wireless carrier that the electronic device 201 is using, and may restrict split billing access to specific wireless carrier(s). In a particular embodiment, the enterprise service 204 supports exclusion tables, so that an IT administrator can set up policy-based exclusions (e.g., an exclusion that VoIP calls are not to be completed via the service platform 212, and are instead to be completed using the voice subsystem 220). To illustrate, voice app calls may terminate at a voice network, but if on the exclusion list they may not be routed through the service platform 212.

In a particular embodiment, the MMP 205 generates notifications that are sent to end users, such as when split billing is added, removed, or changed for a particular electronic device. For example, the MMP 205 may cause a notification to be displayed on-screen at the electronic device 201 or may send an e-mail notification to an e-mail address of an end user. In a particular embodiment, the MMP 205 may implement a restriction that split billing for international data usage is unavailable to the electronic device 201 unless split billing for domestic data usage has previously been configured for the electronic device 201. The MMP 205 may also generate a unique enterprise ID for each enterprise. Enterprise IDs are used by the manifest system 232 to generate manifests of VPN endpoints. In a particular embodiment, the MMP 205 supports a web service. An IT administrator at an employer may log into the web service using a web browser to change device management options for individual employee electronic devices that have been enrolled with the MMP 205, as further described herein.

The service provider network 210 may include a packet gateway (PGW) 211, a service platform 212, a rules engine 213, and a data store (e.g., database) that stores subscriber profile data 214. In a particular embodiment, the PGW 211 includes policy and charging enforcement capability, and the rules engine 213 is configured to evaluate and/or maintain policy and charging rules. The electronic device 201 may communicate with network elements of the service provider network 210 via an access network 207, as shown. In an illustrative example, the access network 207 is part of a wireless access network, such as a 3G network, a 4G network, etc. In an illustrative embodiment, the PGW 211 corresponds to the gateway 152 and the service platform 212 corresponds to the proxy 156 of FIG. 1. In a particular embodiment, the PGW 211 supports policies that are developed at the rules engine 213, sends corporate VPN signaling to the service platform 212, and sends tunnel establishment messages and data traffic to the service platform 212.

The rules engine 213 may store split billing policies that are used to determine how to bill data usage for the electronic device 201. As described above, the service platform 212 may implement a SOCKS5 proxy for web data tunneling. The service platform 212 may also support certificate-based authentication of tunnel data. The service platform 212 may verify provisioning in the subscriber profile data 214, retrieve corporate VPN IP addresses/hostnames from the manifest system 232 using a signed certificate, and route tunnel data from the service provider network 210 to the internet 240.

The service provider network 210 may also include, or may be coupled to, a voice subsystem 220 that completes voice and/or VoIP calls. For example, the voice subsystem 220 may route calls and/or call data to a voice network (e.g., a network that provides access to landline and cellular networks, etc.) via a connection 222. In an illustrative embodiment, the voice subsystem 220 includes or corresponds to the voice call endpoint 154 of FIG. 1.

Components within the service provider network 210 may also be configured to communicate with external systems, such as a web server 246 and enterprise/application VPN endpoints 242 via the internet 240, an enterprise intranet 244, or both. In an illustrative embodiment, the VPN endpoints 242 include the VPN endpoint 170 and the web server 246 corresponds to the web server 180 of FIG. 1. Further, the service platform 212 may be configured to retrieve a manifest 234 from a manifest system 232 that is located within an enterprise cloud 230. The manifest 234 may include a list of VPN hostnames/IP addresses for an enterprise. Although illustrated separately, it is to be understood that in some embodiments the enterprise cloud 230 and the enterprise intranet 244 may be the same network or may include common network element(s).

In a particular embodiment, the manifest system 232 provides a service to the service platform 212, where the service returns a list of VPN hostnames/IP addresses that have been configured for a particular enterprise ID. For example, the manifest system 232 may correspond to a web application that enables access to a database. The manifest system 232 may support representational state transfer (REST) services that the MMP 205 can invoke to send enterprise details to the manifest system 232 and to enable/disable split billing for a particular enterprise and/or employee.

FIG. 2 also illustrates a mediation system 250 and a billing system 260. The mediation system 250 may receive split billing information from the PGW 211 and forward such information to the billing system 260. The billing system 260 may be configured to rate, tax, and render bills associated with different accounts. To illustrate, in the example of FIG. 2, the billing system 260 is configured to generate an enterprise bill 270 associated with an enterprise account 262 and an end-user bill 272 associated with an end-user account 264. In an illustrative example, the end-user account 264 corresponds to a user's personal cell phone bill and the enterprise account 262 is partially or completely paid for by the user's employer.

During operation at the system 200, various workflows may be performed to set up and implement split billing. For example, a sales workflow may be used to initially offer split billing to enterprise customers. The sales workflow may include, but is not limited to:

1. Configuration of the MMP 205 with split billing information for the enterprise customer (e.g., an employer), including number of employees, data usage caps, etc.
2. The enterprise customer agrees to acquire split billing functionality (and optionally acquire international roaming, hybrid billing, etc.).
3. Pseudo-telephone numbers are created for each billable data plan per end user device telephone number acquired by the enterprise customer (e.g., for each employee).
4. IT administrator(s) at the enterprise customer are granted access to the MMP 205 so that the IT administrator(s) can set up configurations for individual employee electronic devices.

As another example of operation at the system 200, an ordering/provisioning workflow for split billing associated with the enterprise customer may include, but is not limited to:

1. Configuration at the PGW 211 for split billing associated with the enterprise customer, including setup of the SOCKs proxy at the service platform 212 and VoIP addresses. Policies and rules for split billing may also be set up at the rules engine 213.
2. IT administrator(s) at the enterprise customer may invite employees to download the enterprise application 202 to their electronic devices, such as the electronic device 201. Alternatively, the enterprise application 202 may be pre-installed to the electronic device 201 before the electronic device 201 is provided to the employee.
3. Device certificates for the electronic devices are created using the issuing CA 203. The device certificates, and revocations thereof, may be managed by the enterprise service 204.
4. IT administrator(s) at the enterprise customer may provide VPN manifest information (e.g., hostnames/IP addresses) to the enterprise service 204. The MMP 205 may send an indicator to the manifest system 232 that split billing is enabled, and the manifest system 232 may retrieve VPN endpoints from the enterprise service 204.
5. The MMP 205 may send a notification to the employee to inform the employee that split billing has been provisioned for their electronic device (e.g., the electronic device 201).

As yet another example of operation at the system 200 of FIG. 2, a network usage workflow for split billing may include, but is not limited to:

1. Initial configuration includes configuring voice and service platform IP address/endpoints at the PGW 211.
2. During a device attach process for the electronic device 201, the rules engine 213 retrieves attributes for the electronic device 201 from the subscriber profile data 214. The rules engine 213 also forwards a manifest URL if present, to the service platform 212. The rules engine 213 recognizes a split billing attribute value in the retrieve attributes and, in response, sets a split billing policy at the PGW 211. An illustrative device attach and session setup process is further described with reference to FIG. 3.
3. The service platform 212 uses the manifest URL (if present) to retrieve the manifest 234 from the manifest system 232. The manifest 234 includes corporate IP addresses/hostnames. The service platform 212 resolves the addresses/hostnames and passes policy information (e.g., IP addresses, port numbers, etc.) via the rules engine 213 to the PGW 211. The service platform 212 stores the manifest information and receives periodic refresh of subscriber profile data from the rules engine 213.
4. During a data usage scenario, a user of the electronic device 201 activates the enterprise application 202. When a data request is made by the enterprise application 202, or by an application executing within the enterprise application 202, one of the following data paths may be used:
   For corporate VPN and/or other corporate identified endpoints, data traffic is sent through the PGW 211 to the corporate destination (e.g., the enterprise/application VPN endpoints 242 and/or other corporate identified endpoints) via the internet 240.
   For voice calls, data traffic is sent through the PGW 211 to the previously configured voice IP address(es) (e.g., in the voice subsystem 220). The traffic can include HTTP/HTTPS traffic, session initiation protocol (SIP) traffic, real-time transport protocol (RTP) traffic, etc.
   Data traffic that is not VPN (and/or for another corporate identified endpoint) or voice is sent through the PGW 211 to the service platform 212 via a SOCKS5 proxy with a signed certificate. The service platform 212 queries the subscriber profile data 214 to validate that split billing is provisioned and passes the data traffic through the internet 240 to a destination (e.g., the web server 246). If authentication failure or another type of failure occurs during this process, errors are provided to the enterprise service 204, which will attempt to send the data via the internet or retry if applicable.

5. The rules engine 213 receives online/real-time usage information from the PGW 211 and applies rules for monitoring and alerting of usage based on plan thresholds. If split billing is provisioned in the subscriber profile data 214 and data usage received from the PGW is 211 relates to business data, the rules engine 213 suppresses data to IT systems and does not provide monitoring. If split billing is not provisioned or the data from the PGW is personal data, the rule engine 213 sends data to IT systems for monitoring and alerting when usage thresholds are met. Offline CDRs 252 are tagged based on a policy set during device attach or a refresh from the rules engine 213. For example, CDRs 252 tagged with a split billing service ID are sent to the mediation system 250, which sends the CDRs 252 to the billing system 260.

As yet another example of operation at the system 200 of FIG. 2, a billing workflow for split billing may include, but is not limited to:

1. As described above, encapsulated requests for split billing may indicate different endpoints: domestic and international service platform end point (tunneled) via SOCKS5 and certificate, corporate VPN endpoint, or voice endpoint. The PGW 211 applies a split billing policy as indicated by the rules engine 213 and sets the split billing service ID. The PGW 211 sends offline data usage CDRs 252 to the mediation system 250.

2. The mediation system 250 stores or has access to a mapping of enterprises to end user subscriptions. The mediation system 250 receives the CDRs 252 and applies the following logic:
   a. If the split billing service ID is set and split billing applies, the existing end user telephone number in the CDR is replaced with the enterprise pseudo-telephone number. The end user telephone number can be added to a new element at the end of the CDR.
   b. If the split billing service ID is set but split billing does not apply, the end user telephone number is kept in the CDR and a default value (e.g., all "9" s) is added at the end of the CDR. Alternatively, the end user telephone number is replaced with the enterprise pseudo-telephone number and the end user telephone number is added at the end of the CDR.
   c. If the split billing service ID is not set, the end user telephone number is kept in the CDR and a default value (e.g., all "9" s) is added at the end of the CDR.

3. An enabler (which may be part of the mediation system 250 or separate from the mediation system 250) determines data usage based on the modified CDRs 252 from the mediation system 250. The enabler provides information regarding the data usage to the appropriate account (e.g., the enterprise account 262 or the end-user account 264) of the billing system 260. The billing system 260 rates, taxes, and renders the bills 270, 272 based on the data usage information.

Although not shown in FIG. 2, it should be appreciated that various other systems, components, and operations may be involved in a service provider's split billing offering. For example, the billing system 260 may be configured to support rating, taxing, and billing of split billing data plans in accordance with local government laws and existing business data plans offered by the service provider.

In a particular embodiment, an electronic device may be excluded from split billing in certain situations. For example, the electronic device 201 may be excluded from split billing if the electronic device 201 is connected to a wireless carrier other than the service provider of FIG. 2, the electronic device 201 does not have a data plan, the electronic device 201 is on a prepaid account, the electronic device 201 is on a reseller account, the electronic device is on a specific local, regional, or international carrier or account, the electronic device 201 is on a split liability account, the electronic device 201 is on a copay account, etc.

It should be noted that although various embodiments are described herein with reference to a "container" on the device side (e.g., at the electronic device 201), this is not to be considered limiting. In alternative implementations, different components and operations may be used on the device side. For example, in some embodiments, a software development kit (SDK) may be embedded into a mobile application that is executed on the device side, where the SDK has instructions for split billing. In this example, a user may not be aware of whether they are in a separate work environment, yet the costs of data usage would still be covered (e.g., by their employer). The manifest whitelist approach described herein does not require a "container." Thus, the present disclosure is not limited to container-only client/device side aspects.

Figure 3:
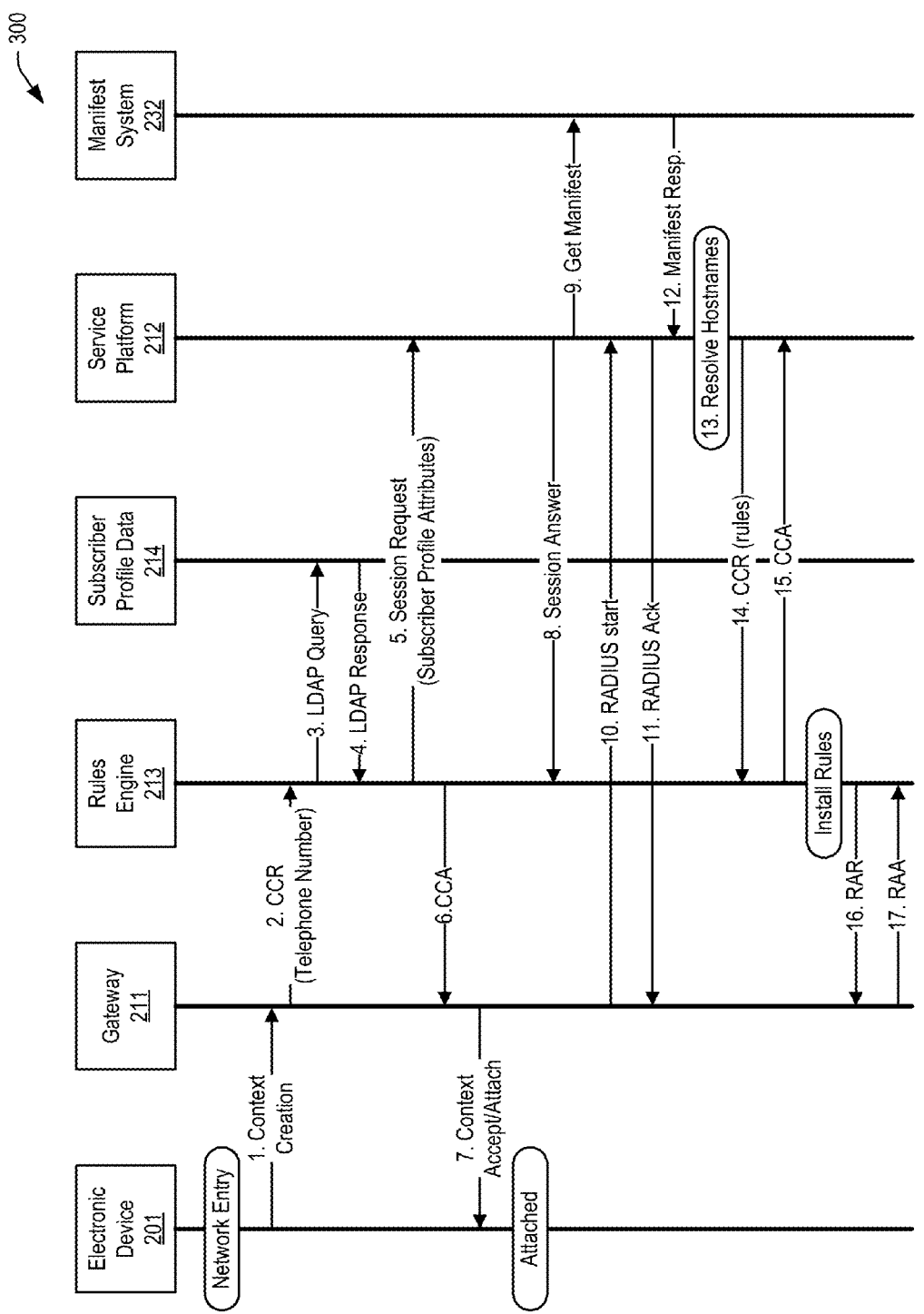
FIG. 3 is a ladder diagram to illustrate a particular embodiment of messaging associated with a device attachment and split billing session setup process.

FIG. 3 depicts a particular embodiment of a device attach and split billing session setup process 300. In an illustrative example, the process 300 is performed at the system 200 of FIG. 2.

When the electronic device 201 enters into the network and initiates device attachment, a context creation message (1) may be sent to the PGW 211. In a particular embodiment, the context is a packet data protocol (PDP) context. The PGW 211 may send a credit-control-request (CCR) (2) to the rules engine 213, where the CCR includes the telephone number of the electronic device 201. The rules engine 213 may query the subscriber profile data 214 for attributes associated with the telephone number. For example, the rules engine may send a lightweight directory access protocol (LDAP) query (3) to the subscriber profile data 214 and receive a LDAP response (4) from the subscriber profile data 214 including the attributes. The rules engine 213 may then send a session request message (5) to the service platform 212 and a credit-control-answer (CCA) (6) to the PGW 211, which may send a context accept/attach message (7) to the electronic device. The rules engine may receive a session answer message (8) from the service platform 212. The session request message may include information (e.g., LDAP attributes and manifest URL) retrieved from the subscriber profile data 214. In an illustrative example, the session request message includes a traffic detection function (TDF)-session-request (TSR) and the session answer message includes a TDF-session-answer (TSA). The service platform 212 may use the manifest URL from the session request message (5) to send a request (9) to the manifest system 232 for a manifest, such as the manifest 234.

The PGW 211 may also send a remote authentication dial in user service (RADIUS) protocol start message (10) to the service platform 212 and receive a RADIUS acknowledgement (Ack) (11) from the service platform 212 in response. The RADIUS start and Ack messages may be used for authentication, authorization, and accounting (AAA) management.

The service platform 212 may receive a response (12) including the manifest from the manifest system 232, and may resolve (13) the hostnames included in the manifest.

The rules engine 213 may receive a CCR (14) that includes split billing rules from the service platform 212. The rules engine 213 may send a CCA (15) back to the service platform 212. The rules engine 213 may install the rules, as shown, and send a re-auth-request (RAR) (16) to the PGW 211. Charging rules may be set and installed at the PGW 211, which may respond with a re-auth-answer (RAA) message (17), as shown.

It will be appreciated that the split billing systems described with reference to FIGS. 1-3 may enable an employer to offer a bring-your-own-device (BYOD) program in which employees can use personal electronic devices for personal use and work use. The user of request encapsulation and tunneling (e.g., VPN) may enable accurate tracking and distinguishing between work and personal data use, so that the employer can be charged for work data usage but not personal data usage, and the employee can be charged for personal data usage but not work data usage. In some examples, the described techniques may enable hybrid billing options. For example, an employer may elect to pay for all work data usage and the first two gigabytes (or another threshold amount) of personal data usage, and any overages above two gigabytes may be billed to the employee's personal account.

Particular embodiments in accordance with the present disclosure may also support domestic and international roaming. For example, requests issued by an electronic device while the device is roaming may automatically be billed to an employer if the employer has set up an international roaming data package with the service provider.

Figure 4:
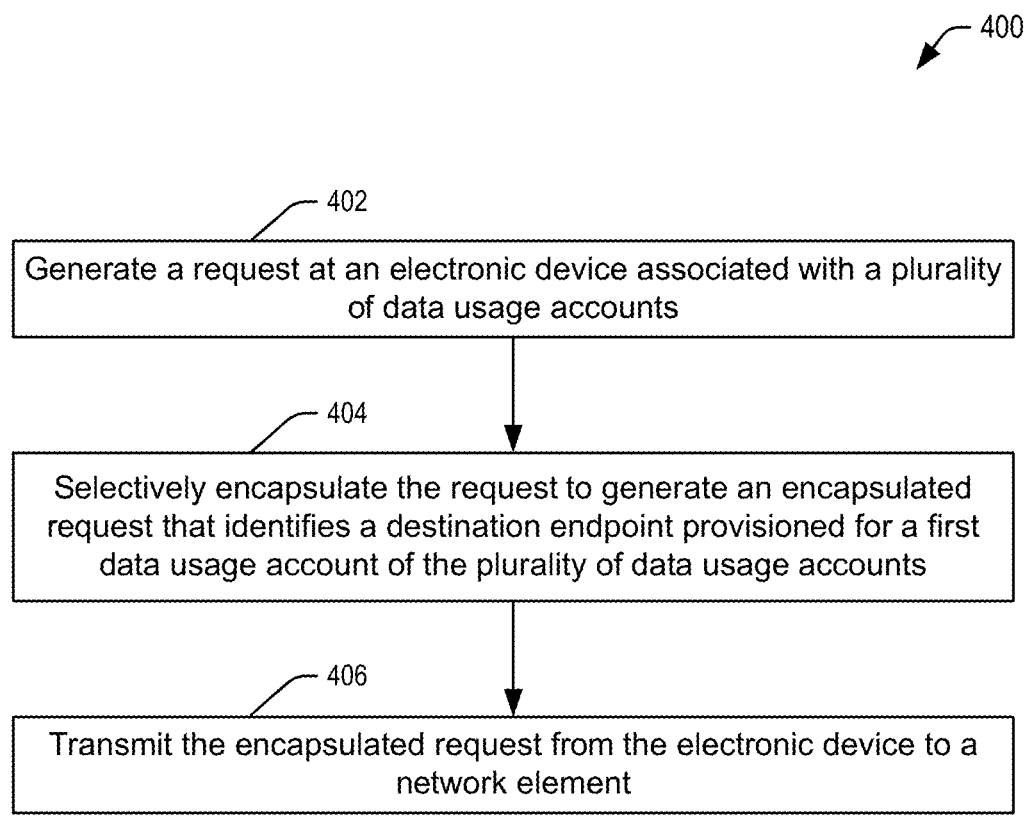
FIG. 4 is a flowchart to illustrate a particular embodiment of a method of operation at an electronic device of FIG. 1, FIG. 2, or FIG. 3.

FIG. 4 is a flowchart to illustrate a particular embodiment of a method 400 of operation at an electronic device. For example, the method 400 may be performed at the electronic device 110 of FIG. 1 or the electronic device 201 of FIGS. 2 and 3.

The method 400 includes generating a request at an electronic device associated with a plurality of data usage accounts, at 402. For example, referring to FIG. 1, the electronic device 110 may generate the request 122, the request 132, or a voice call request associated with the voice call information 142.

The method 400 also includes selectively encapsulating the request to generate an encapsulated request, at 404. The encapsulated request may identify a destination endpoint that is provisioned for a first data usage account of the plurality of data usage accounts. For example, referring to FIG. 1, the electronic device 110 may generate the first encapsulated request 120, the second encapsulated request 130, or the third encapsulated request 140, each of which identifies an endpoint provisioned for the enterprise account 112.

The method 400 further includes transmitting the encapsulated request from the electronic device to a network element, at 406. For example, referring to FIG. 1, the electronic device 110 may transmit the first encapsulated request 120, the second encapsulated request 130, or the third encapsulated request 140 to a network element of the service provider 150, such as the gateway 152, the proxy 156, the voice call endpoint 154, etc.

Figure 5:
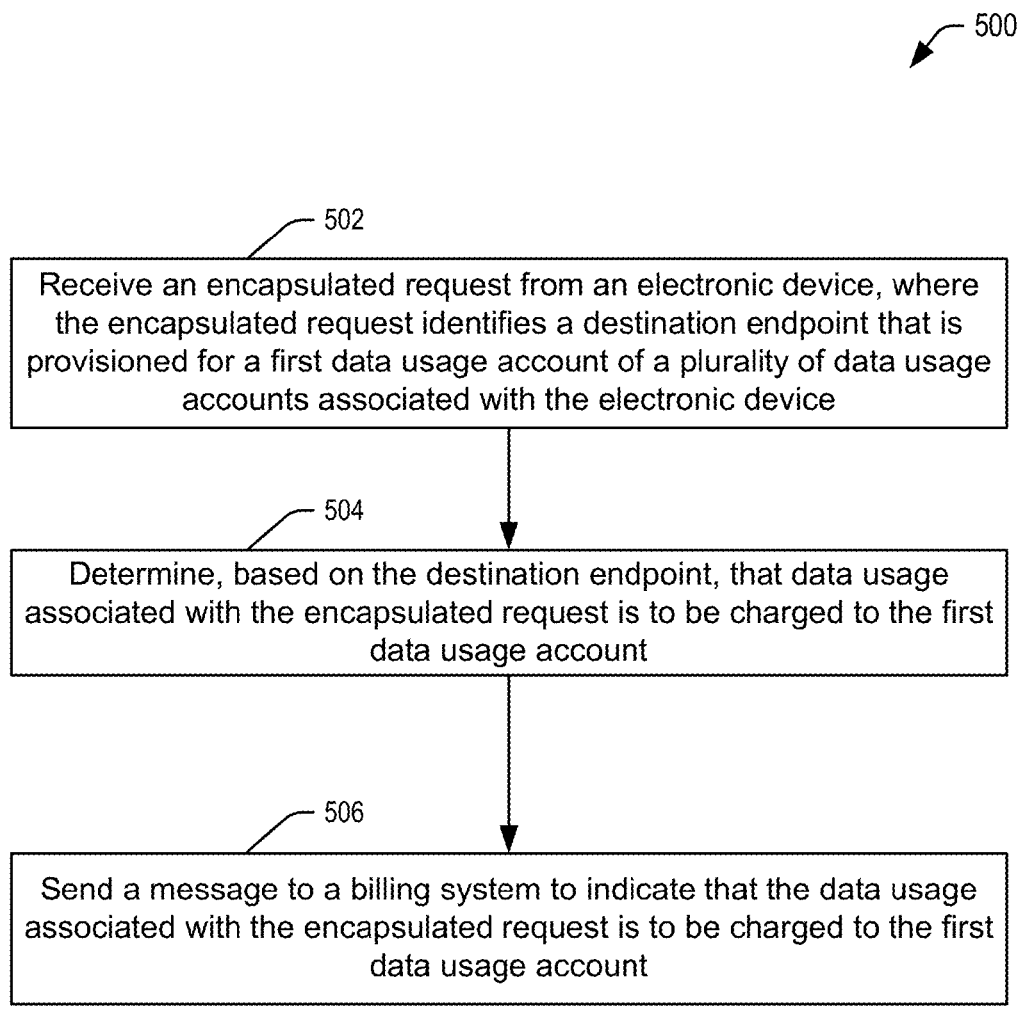
FIG. 5 is a flowchart to illustrate a particular embodiment of a method of operation at one or more network elements of FIG. 1, FIG. 2, or FIG. 3.

FIG. 5 is a flowchart to illustrate a particular embodiment of a method 500 of operation at one or more network elements. For example, the method 500 of FIG. 5, or portions thereof, may be performed at one or more of the network elements 152, 154, 156, 158 of FIG. 1 or the network elements 211, 212, 213, 214 of FIGS. 2 and 3.

The method 500 includes receiving an encapsulated request from an electronic device, where the encapsulated request identifies a destination endpoint that is provisioned for a first data usage account of a plurality of data usage accounts associated with the electronic device, at 502. For example, referring to FIG. 1, the gateway 152 may receive the first encapsulated request 120, the second encapsulated request 130, or the third encapsulated request 140 from the electronic device 110.

The method 500 also includes determining, based on the destination endpoint, that data usage associated with the encapsulated request is to be charged to the first data usage account, at 504. For example, referring to FIG. 1, the gateway 152 may determine that data usage associated with the first encapsulated request 120, the second encapsulated request 130, or the third encapsulated request 140 is to be charged to the enterprise account 112.

The method 500 further includes sending a message to a billing system to indicate that the data usage associated with the encapsulated request is to be charged to the first data usage account, at 506. For example, referring to FIG. 1, the gateway 152 may send a message to the billing system 158 to indicate that data usage is to be charged to the enterprise account 112. In an illustrative example, the gateway 152 may send the billing system 158 CDRs with a split billing service ID set, as described with reference to the CDRs 252 of FIG. 2.

Figure 6:
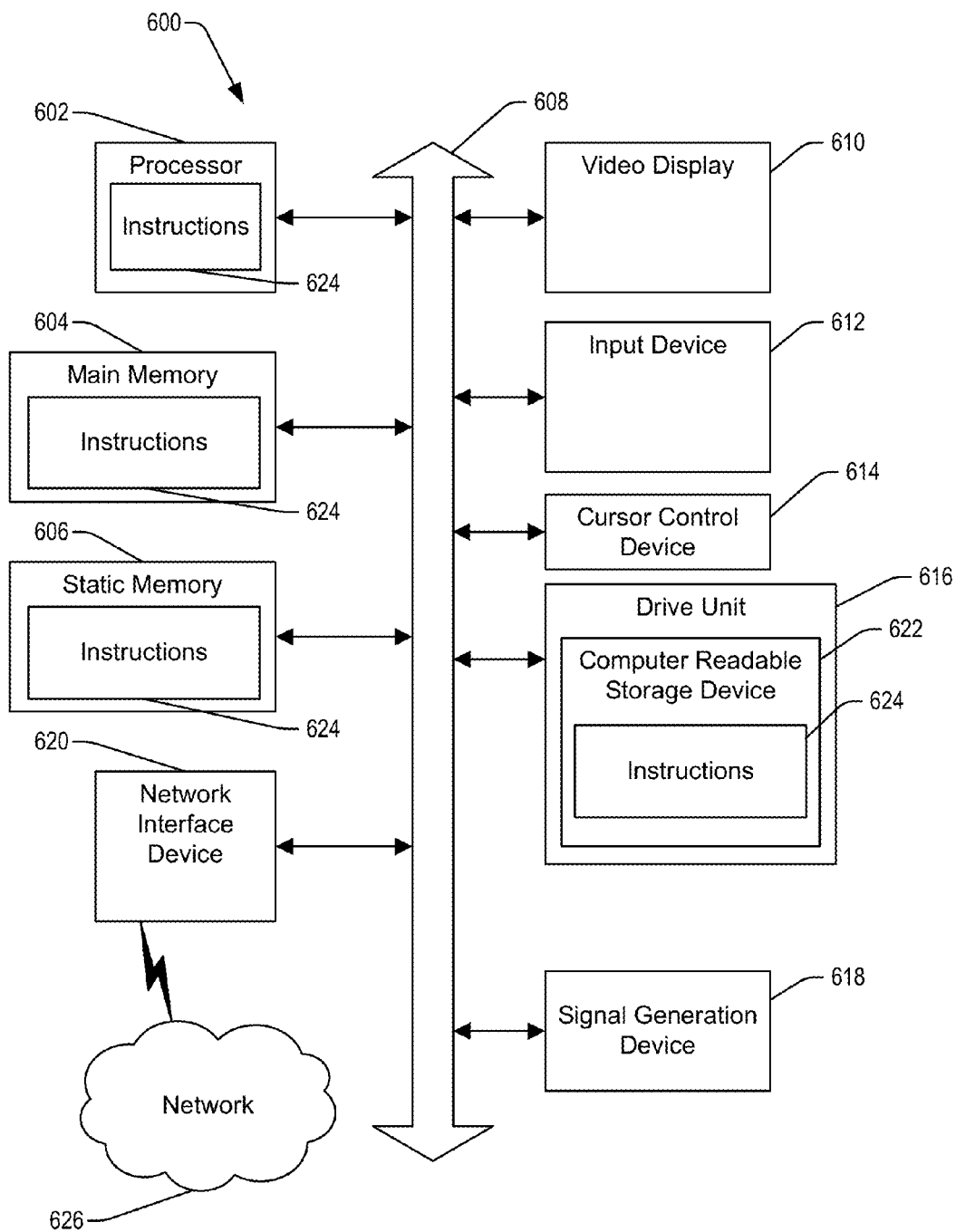
FIG. 6 is a block diagram of an illustrative embodiment of a general computer system operable to support embodiments of computer-implemented methods, computer program products, and system components as illustrated in FIGS. 1-5 and/or as described herein.

FIG. 6 is a block diagram illustrating an embodiment of a general computer system that is generally designated 600. The computer system 600 may be operable to support embodiments of computer-implemented methods, computer program products, and system components as illustrated in FIGS. 1-5. In a particular embodiment, the computer system 600 may correspond to the electronic device 110, one of the network elements 152, 154, 156, 158, the endpoint 170, the web server 180 of FIG. 1, the electronic device 201, the CA/CRL 203, the enterprise service 204, the mobility management portal 205, one of the network elements 211-214, the voice subsystem 220, the web server 246, the manifest system 232, the mediation system 250, the billing system 260 of FIG. 2, another electronic or computing device, or any combination thereof. The computer system 600 may be coupled to, or in communication with, other computer systems or peripheral devices (e.g., via a network of the service provider 150, the internet 160 of FIG. 1, the access network 207, the service provider network 210, the internet 240, the intranet 244, the enterprise cloud 230 of FIG. 2, or a combination thereof).

The computer system 600 may be implemented as or incorporated into various devices, such as a tablet computer, a personal digital assistant (PDA), a palmtop computer, a laptop computer, a smartphone, a communications device, a web appliance, a display device, a computing device, a media player, or any other machine capable of executing a set of instructions (sequential or otherwise) that specify actions to be taken by that machine. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU). In a particular embodiment, the processor 602 may correspond to, or include or execute instructions 624 associated with, one or more components, modules, and operations described with reference to FIGS. 1-5. In a particular embodiment, the processor 602 may include multiple processors. For example, the processor 602 may include distributed processors, parallel processors, or both. The multiple processors may be included in, or coupled to, a single device or multiple devices. The processor 602 may include a virtual processor. In a particular embodiment, the processor 602 may include a state machine, an application specific integrated circuit (ASIC), or a programmable gate array (PGA) (e.g., a field PGA).

Moreover, the computer system 600 may include a main memory 604 and a static memory 606 that may communicate with each other via a bus 608. The main memory 604, the static memory 606, or both, may include the instructions 624, as shown. The instructions 624, when executed by the processor 602, may cause the processor 602 to perform operations described with reference to FIGS. 1-5. As shown, the computer system 600 may further include or be coupled to a display unit 610, such as a liquid crystal display (LCD), an organic light emitting diode (OLED), a flat panel display, a solid-state display, or a projection display. Additionally, the computer system 600 may include an input device 612, such as a keyboard, a remote control device, and a cursor control device 614, such as a mouse. In a particular embodiment, the cursor control device 614 may be incorporated into the remote control device. In a particular embodiment, the display unit 610 and the input device 612 are incorporated into touchscreen. The computer system 600 may also include a disk drive unit 616, a signal generation device 618, such as a speaker, and a network interface device 620. The network interface device 620 may be coupled to other devices (not shown) via a network 626. The network 626 may correspond to a network of the service provider 150, the internet 160 of FIG. 1, the access network 207, the service provider network 210, the internet 240, the intranet 244, the enterprise cloud 230 of FIG. 2, or some other network.

In a particular embodiment, as depicted in FIG. 6, the disk drive unit 616 may include a tangible computer-readable storage device 622 in which the instructions 624, e.g., software, may be embedded. Further, the instructions 624 may embody one or more of the methods or logic as described herein. In a particular embodiment, the instructions 624 may reside completely, or at least partially, within the memory 604, the static memory 606, and/or within the processor 602 during execution by the computer system 600. The processor 602 may execute the instructions 624 to perform operations corresponding to one or more of the methods or logic as described herein. The processor 602 may perform the operations directly, or the processor 602 may facilitate, direct, or cooperate with another device or component to perform the operations.

In an alternative embodiment, dedicated hardware implementations, such as application specific integrated circuits, programmable logic arrays and other hardware devices, can be constructed to implement one or more of the operations or methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein. The present disclosure describes a computer-readable storage device that includes the instructions 624 to enable tracking of data usage for split billing.

While the computer-readable storage device is shown to be a single device, the term "computer-readable storage device" includes a single device or multiple devices, such as centralized or distributed storage, and/or associated caches that store one or more sets of instructions. The term "computer-readable storage device" shall also include any device that is capable of storing a set of instructions for execution by a processor or that causes a computer system to perform any one or more of the methods or operations disclosed herein.

In a particular non-limiting, exemplary embodiment, the computer-readable storage device can include a solid-state memory such as a memory card or other package that houses one or more non-volatile read-only memories. Further, the computer-readable storage device can be a random access memory or other volatile re-writable memory. Additionally, the computer-readable storage device can include a magneto-optical or optical medium, such as a disk or tapes. A computer-readable storage device is an article of manufacture and is not a signal.

It should also be noted that software that implements the disclosed operations may be stored on a storage device, such as: a disk or tape; a magneto-optical or optical device, such as a disk; or a solid state device, such as a memory card or other package that houses one or more read-only (non-volatile) memories, random access memories, or other re-writable (volatile) memories.

Although the present specification describes components and functions that may be implemented in particular embodiments with reference to particular standards and protocols, the claims are not limited to such standards and protocols. For example, standards for Internet, other packet switched network transmission and standards for viewing media content represent examples of the state of the art. Such standards are periodically superseded by faster or more efficient equivalents having essentially the same functions. Accordingly, replacement standards and protocols having the same or similar functions as those disclosed herein are considered equivalents thereof.

Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. As the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising: receiving user input during execution of a first application at an electronic device, the user input corresponding to a selection of a first data usage account of a plurality of data usage accounts associated with the electronic device and the user input indicating that data usage of the electronic device is to be billed to the first data usage account; generating a request during execution of a second application at the electronic device; based on the selection of the first data usage account, encapsulating, by the electronic device, the request to generate an encapsulated request that identifies a destination endpoint provisioned for the first data usage account; and transmitting the encapsulated request from the electronic device to a network element, wherein the encapsulated request further identifies a uniform resource locator, and wherein data usage associated with accessing the uniform resource locator is charged to the first data usage account.

2. The method of claim 1, wherein the destination endpoint comprises a voice call endpoint.

3. The method of claim 1, wherein the destination endpoint comprises a virtual private networking endpoint or a business endpoint.

4. The method of claim 1, wherein the destination endpoint comprises a service platform.

5. The method of claim 4, wherein the service platform hosts a proxy.

6. The method of claim 5, wherein the proxy comprises a socket secure proxy.

7. The method of claim 1, wherein the plurality of data usage accounts comprises an enterprise account and a personal account.

8. The method of claim 1, wherein the first application comprises a workspace application that enables switching between the plurality of data usage accounts and that enables execution of other applications from within the workspace application.

9. The method of claim 1, wherein data usage associated with each of the plurality of data usage accounts is billed separately.

10. The method of claim 1, wherein the first data usage account is associated with a reachable telephone number and wherein a second data usage account of the plurality of data usage accounts is associated with a pseudo-telephone number.

11. The method of claim 1, wherein the electronic device is configured to refrain from encapsulating requests while a second data usage account of the plurality of data usage accounts is selected.

12. The method of claim 1, further comprising after transmitting the encapsulated request:
receiving second user input during execution of the first application, the second user input corresponding to selection of a second data usage account of the plurality of data usage accounts;
generating a second request during execution of the second application at the electronic device;
based on the selection of the second data usage account, encapsulating the second request to generate a second encapsulated request that identifies a second destination endpoint that is distinct from the destination endpoint and that is provisioned for the second data usage account; and
transmitting the second encapsulated request.

13. A network element comprising: a processor; and a memory storing instructions executable by the processor to perform operations comprising: receiving, at a proxy server, an encapsulated request from an electronic device, wherein the encapsulated request identifies a destination endpoint that is distinct from the proxy server and that is provisioned for a first data usage account of a plurality of data usage accounts associated with the electronic device; determining, based on the destination endpoint, that data usage associated with the encapsulated request is to be charged to the first data usage account; extracting a request from the encapsulated request, wherein the request is associated with a uniform resource locator; and forwarding the extracted request to a server associated with the uniform resource locator.

14. The network element of claim 13, wherein the operations further comprise sending a message to a billing system to indicate that the data usage associated with the encapsulated request is to be charged to the first data usage account.

15. The network element of claim 13, wherein the operations further comprise: extracting a virtual private networking request or business data request from a second encapsulated request; and forwarding the extracted virtual private networking request or business data request to a virtual private networking destination or business destination.

16. The network element of claim 13, wherein the operations further comprise: determining that a second encapsulated request is associated with a voice call from an over the top voice calling application; and forwarding data associated with the encapsulated request to a voice call endpoint.

17. A computer-readable storage device storing instructions that, when executed by a processor, cause the processor to perform operations comprising: receiving user input during execution of a first application at an electronic device, the user input corresponding to a selection of a first data usage account of a plurality of data usage accounts associated with the electronic device, and the user input indicating that data usage of the electronic device is to be billed to the first data usage account; generating a request during execution of a second application at the electronic device; based on the selection of the first data usage account, encapsulating the request to generate an encapsulated request that identifies a destination endpoint provisioned for the first data usage account; and transmitting the encapsulated request from the electronic device to a network element, wherein the encapsulated request further identifies a uniform resource locator, and wherein data usage associated with accessing the uniform resource locator is charged to the first data usage account.

18. The computer-readable storage device of claim 17, wherein the plurality of data usage accounts includes an enterprise account and a personal account.

* * * * *